US009339731B2

(12) United States Patent
Kim

(10) Patent No.: US 9,339,731 B2
(45) Date of Patent: May 17, 2016

(54) METHOD AND APPARATUS FOR PROVIDING QUEST IN ONLINE GAME

(71) Applicant: Intellectual Discovery Co., Ltd., Seoul (KR)

(72) Inventor: Jeong Hun Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 8 days.

(21) Appl. No.: 14/363,972

(22) PCT Filed: Nov. 26, 2012

(86) PCT No.: PCT/KR2012/010019
§ 371 (c)(1),
(2) Date: Jun. 9, 2014

(87) PCT Pub. No.: WO2013/085192
PCT Pub. Date: Jun. 13, 2013

(65) Prior Publication Data

US 2014/0323216 A1 Oct. 30, 2014

(30) Foreign Application Priority Data

Dec. 8, 2011 (KR) ........................ 10-2011-0131323

(51) Int. Cl.
*A63F 13/30* (2014.01)
*G07F 17/32* (2006.01)

(52) U.S. Cl.
CPC ................ *A63F 13/12* (2013.01); *G07F 17/32* (2013.01)

(58) Field of Classification Search
USPC ............................................................ 463/31
See application file for complete search history.

(56) References Cited

U.S. PATENT DOCUMENTS 9,017,172 B2 * 4/2015 Kosuge .................. A63F 13/12 463/42
2013/0281186 A1 * 10/2013 Kosuge .................. A63F 13/12 463/24

FOREIGN PATENT DOCUMENTS

KR 10-2006-0129892 A 12/2006
KR 10-2009-0041203 A 4/2009

(Continued)

OTHER PUBLICATIONS

International Preliminary Report on Patentability and English translation of Written Opinion issued in International Application No. PCT/KR2012/010019 on Jun. 10, 2014 , 8 pages.
"[Deonpa Communication of OP] Everyday Deonpa Habit" (Naver Blog) Apr. 12, 2010 (http://opkolj2.blog.me/140104924903), 7 pages, See p. 5.

(Continued)

*Primary Examiner* — Pierre E Elisca
(74) *Attorney, Agent, or Firm* — Sughrue Mion, PLLC

(57) ABSTRACT

A technique is provided to improve interests of users in a game by providing various kinds of quests and providing each quest in a customized manner to correspond to a user level. A method for providing a quest in an online game, includes: by a quest providing apparatus, sensing whether at least one user terminal access a game performing server; receiving, from the game performing server, user information corresponding to the user terminal accessing the game performing server and a match condition including at least one condition required to perform a match by a game server; setting a basic quest as at least one quest connected to each other such that when one quest is completed, another quest is started, according to the received user information and match condition; setting an extended quest as a quest to be provided one time per user from among a plurality of quests according to the user information and the match condition; setting a repeated quest as a quest to be repeatedly provided from the plurality of quests according to the user information and the match condition; and transmitting the basic quest, the extended quest, and the repeated quest, which are set by the quest providing apparatus, to the game performing server, displaying the basic quest, the extended quest, and the repeated quest on the user terminal by the game performing server, and applying the basic quest, the extended quest, and the repeated quest to the game.

15 Claims, 11 Drawing Sheets

(56) References Cited

FOREIGN PATENT DOCUMENTS

| | | | |
|---|---|---|---|
| KR | 10-2009-0105735 | A | 10/2009 |
| KR | 10-2010-0006496 | A | 1/2010 |

OTHER PUBLICATIONS

"[Emul] Online Qwest in Single mode!" (Naver Blog), Feb. 25, 2008 (http://blog.naver.com/asura32/110028207499), 6 pages, See p. 1.

* cited by examiner

FIG. 5

| EXTENDED QUEST |
| --- |
| EQ Type A |
| EQ A1<br>EQ A2 |
| EQ Type B |
| EQ B1<br>EQ B2 |
| EQ Type C |
| EQ C1<br>EQ C2<br>EQ C3<br>EQ C4<br>EQ C5<br>EQ C6<br>EQ C7<br>EQ C8<br>EQ C9 |
| EQ Type D |
| EQ D1<br>EQ D2 |
| EQ Type E |
| EQ E1<br>EQ E2<br>EQ E2 |

FIG. 6

| REPEATED QUEST |
| --- |
| RQ1 |
| RQ2 |
| RQ3 |
| RQ4 |

METHOD AND APPARATUS FOR PROVIDING QUEST IN ONLINE GAME

CROSS REFERENCE TO RELATED APPLICATIONS

This application is a 35 U.S.C. §371 National Phase Entry Application from PCT/KR2012/010019, filed Nov. 26, 2012, and designating the United States, which claims priority under 35 U.S.C. §119 to Korean Patent Application No. 10-2011-0131323 filed Dec. 8, 2011, which are incorporated herein in their entireties.

TECHNICAL FIELD

The present invention relates to a technique of an online game providing a quest, which can improve interests of users by providing various types of quests.

BACKGROUND ART

An on-line game is a field which becomes more popular in an on-line cultural industry in recent years by the development of a network and computer technology. Users access a game server using terminals of the users and select a specific character to manipulate the character on-line and enjoy the game. With the development of the online games, the users require various genres of online games, and very various genres of online games have recently been being serviced.

As the types and number of the online games are increased, various online games have been being providing users with various modes in addition to a scenario mode for performing a game according to a simply determined game scenario in order to lead more users to enjoy the games In the meantime, various currently serviced online games provide a quest which is a conditional mission independently of the mode services. The quest is a game service method for improving users' interests by providing various missions during game performance in various modes including the scenario mode and awarding prizes to a user who accomplishes a corresponding mission. In general, the quest is provided in a mission-in-mission form connected to a mission of the present mode, in which the mission of the present mission can be accomplished even when a corresponding quest is not succeeded. As a result, the quest is a kind of optional mission that does not affect game performance even though the quest is not performed, but facilitates more smooth game performance by using a prize awarded when the mission is accomplished, thereby improving game interest of users. Further, the quest is used as a game guide for enabling new users to acquire game characteristics such as game manipulating method and/or world views of game. Accordingly, the users desire to complete as many quests as possible to reduce a time that it takes to increase the level. Particularly, new users are required to performed many quests for quicker game adaptation.

However, as for the quest in the conventional online game, a specific quest is provided with a user only when the user searches for the quest during game performance, or detailed contents required for performing the quest are given to only the user who is under a condition for performing the quest, instead of the case that the quest is automatically customized and provided to the user. Accordingly, a new user may not receive the quest mostly. Further, a plurality of quests in an online game may be generally provided together at once instead of one quest. In this case, a new user may have difficulty in managing the plurality of quests. In addition, a high difficulty level quest that is not easily performed by a low-level user may be frequently provided. Accordingly, there is a problem in that this quest may act as an entry barrier to a new user rather than the guide.

DISCLOSURE

Technical Problem

The present invention has been made in an effort to provide a method and an apparatus for providing a quest in an online game, having advantages of being capable of improving interests of users in the game and serving as a guide for a new user by various kinds of quests that are divided into a basic quest, an extended quest, and a daily repeated quest and providing each quest in a customized manner to correspond to a user level.

Technical Solution

An exemplary embodiment of the present invention provides a method for providing a quest in an online game, including: by a quest providing apparatus, sensing whether at least one user terminal access a game performing server; receiving, from the game performing server, user information corresponding to the user terminal accessing the game performing server and a match condition including at least one condition required to perform a match by a game server; setting a basic quest as at least one quest connected to each other such that when one quest is completed, another quest is started, according to the received user information and match condition; setting an extended quest as a quest to be provided one time per user from among a plurality of quests according to the user information and the match condition; setting a repeated quest as a quest to be repeatedly provided from the plurality of quests according to the user information and the match condition; and transmitting the basic quest, the extended quest, and the repeated quest, which are set by the quest providing apparatus, to the game performing server, displaying the basic quest, the extended quest, and the repeated quest on the user terminal by the game performing server, and applying the basic quest, the extended quest, and the repeated quest to the game.

The setting of the basic quest may include: receiving the user information and the match condition from the game performing server; checking the received user information and match condition and checking a basic quest that has been completed until a previous match according to the checked user information and match condition; determining whether there is a desired basic quest that is to be performed by being connected to the completed basic quest; and, in case that there is the desired basic quest, setting the desired basic quest as the basic quest.

The setting of the desired basic quest as the basic quest may include determining whether the user information and the match condition correspond to a condition that is set for the desired basic quest; and, in case that the user information and the match condition correspond to the condition that is set for the desired basic quest, setting the desired basic quest as the basic quest.

The setting of the extended quest may include receiving the user information and the match condition from the game performing server; checking the received user information and match condition, and checking an extended quest that has been completed until a previous match according to the checked user information and match condition; and setting the extended quest, one randomly selected from among the remaining ones of the extended quests that are providable to the user based on the match condition, except the completed extended quest.

The quest providing method may further include, when the user terminal accesses the game performing server, transmitting an ongoing quest that has been being performed by the user to the game performing server and controlling the ongoing quest to be displayed on the user terminal.

The displaying of the ongoing quest includes controlling the game performing server to determine whether the transmitted ongoing quest is the basic quest, the extended quest, and the repeated quest, and to configure a screen of the user terminal such that the quests are displayed at different display regions; and controlling the game performing server to transmit the configured screen to the user terminal to display the screen thereon.

The applying of the quest to the match may include, when an input for checking a quest list, displayed on the user terminal, with at least one quest that is applicable to the game is received from the user terminal, displaying the quest list on the user terminal; performing the game by applying at least one quest included in the quest list when the game is started; determining whether there is accomplished one of the applied quests by using game performance information received from the game performing server; in case that there is the accomplished quest, recognizing information related to the accomplished quest; transmitting, to the user terminal, information reporting that a quest corresponding to the recognized quest information has been accomplished.

The displaying of the quest list may include dividing at least one quest included in the quest list according to at least one of the basic quest, the extended quest, and the repeated quest and displaying it.

The quest providing method may further include, when a selection input for any one quest included in the quest list is received from the user terminal, displaying detailed information on the user terminal, the detailed information serving to display at least one of game performance contents that are required to be completed for accomplishing the quest selected according to the selection input, contents previously completed by the user among the required game performance contents, and remaining game performance contents that are required to be completed except the previously completed contents.

Another exemplary embodiment of the present invention provides an apparatus providing a quest in an online game, including: a basic quest setter configured to store a plurality of basic quests that are provided in a stepwise manner by being connected to each other such that when one of the basic quests is completed, another basic quest is started; an extended quest setter configured to store a plurality of extended quests that are provided one time per user; a repeated quest setter configured to set a plurality of repeated quests that are repeatedly providable; and a quest manager configured to receive user information corresponding to a user terminal accessing a game performing server and a match condition including at least one condition required to perform a match by the game performing server, and respectively receive the basic quest, the extended quest, and the repeated quest from the basic quest setter, the extended quest setter, and the repeated quest setter according to the user information and the match condition, to transmit them to the game performing server.

The quest manager may check the user information and the match condition, checks a basic quest that has been completed until a previous match among the basic quests stored in the basic quest setter according to the checked user information and match condition, determine whether there is a desired basic quest that is to be performed by being connected to the completed basic quest, and, in case that there is the desired basic quest, set the desired basic quest as the basic quest.

The quest manager may determine whether the user information and the match condition correspond to a condition that is set for the desired basic quest, and, in case that the user information and the match condition correspond to the condition that is set for the desired basic quest, set the desired basic quest as the basic quest.

The quest manager may check the user information and the match condition, check an extended quest that has been completed until a previous match among the extended quests stored in the extended quest setter, and set, as the extended quest, one randomly selected from among the remaining the extended quests except the completed extended quest, according to the checked user information and match condition.

The quest manager may respectively receive detailed information related to the basic quest, the extended quest, and the repeated quest from the basic quest setter, the extended quest setter, and the repeated quest setter, and analyze performed information and performing information of each of the basic quest, the extended quest, and the repeated quest to transmit the analyzed information to the game performing server, the performed information indicating information related to the performed quest and the performing information indicating information related to the quest to be performed.

Advantageous Effects

In accordance with the present invention, it is possible to provide an effect capable of faithfully serving as a guide for a new user to facilitate easy adaption of the new user to the game and improving interests of old users in the game by various kinds of quests that are divided into a basic quest, an extended quest, and a daily repeated quest and providing the divided quests in a customized manner to correspond to user levels.

DESCRIPTION OF THE DRAWINGS

FIG. 5 shows a part of an extended quest in accordance with the present exemplary embodiment.

FIG. 6 shows a part of a daily repeated quest in accordance with the present exemplary embodiment.

MODE FOR INVENTION

Figure 1:
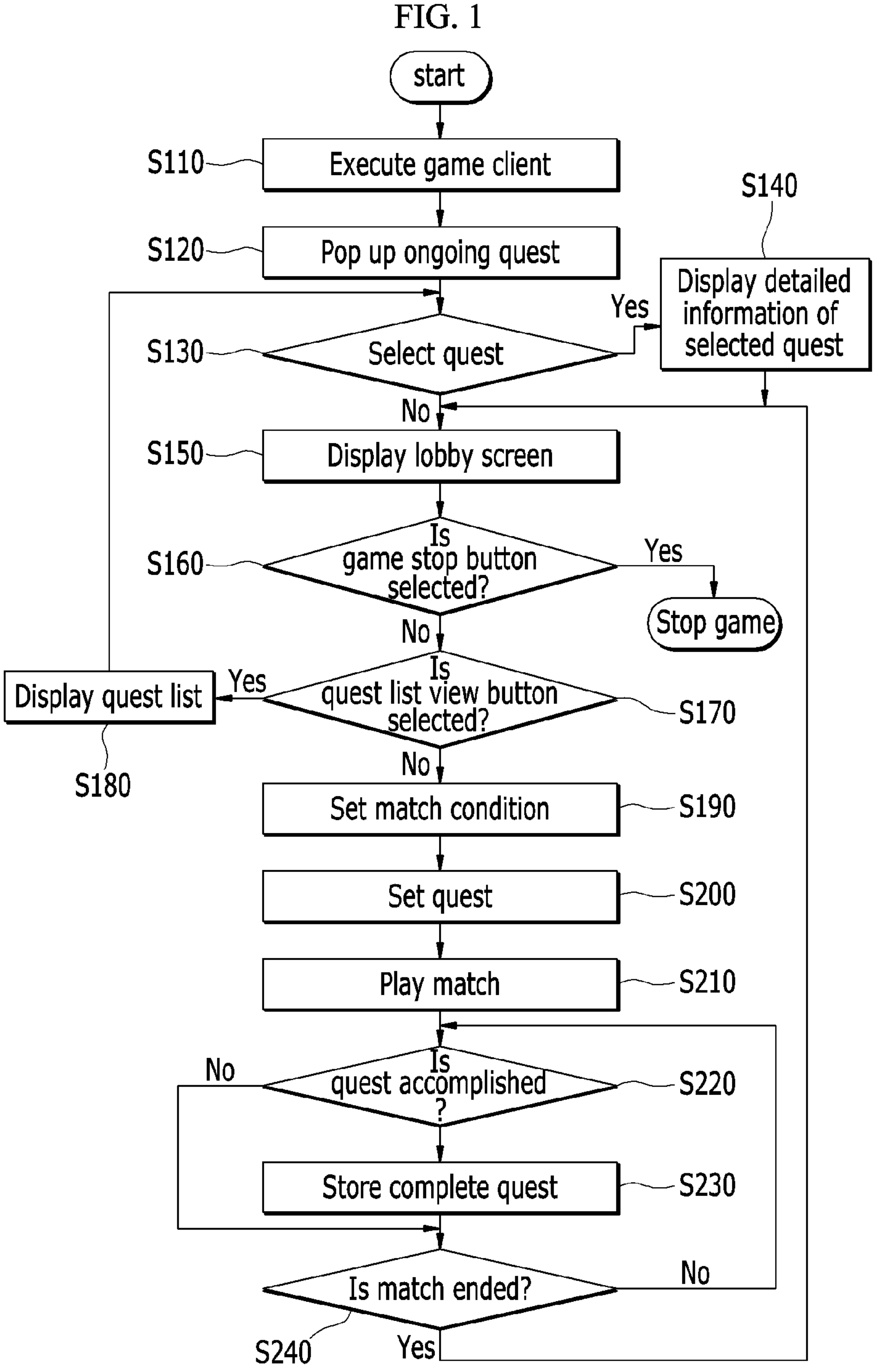
FIG. 1 is a flowchart showing a method for providing a quest in an online game in accordance with an exemplary embodiment of the present invention.

An exemplary embodiment of the present invention provides a method for providing a quest in an online game, including: by a quest providing apparatus, sensing whether at least one user terminal access a game performing server; receiving, from the game performing server, user information corresponding to the user terminal accessing the game performing server and a match condition including at least one condition required to perform a match by a game server; setting a basic quest as at least one quest connected to each other such that when one quest is completed, another quest is started, according to the received user information and match condition; setting an extended quest as a quest to be provided one time per user from among a plurality of quests according to the user information and the match condition; setting a repeated quest as a quest to be repeatedly provided from the plurality of quests according to the user information and the match condition; and transmitting the basic quest, the extended quest, and the repeated quest, which are set by the quest providing apparatus, to the game performing server, displaying the basic quest, the extended quest, and the repeated quest on the user terminal by the game performing server, and applying the basic quest, the extended quest, and the repeated quest to the game.

The setting of the basic quest may include: receiving the user information and the match condition from the game performing server; checking the received user information and match condition and checking a basic quest that has been completed until a previous match according to the checked user information and match condition; determining whether there is a desired basic quest that is to be performed by being connected to the completed basic quest; and, in case that there is the desired basic quest, setting the desired basic quest as the basic quest.

The setting of the desired basic quest as the basic quest may include determining whether the user information and the match condition correspond to a condition that is set for the desired basic quest; and, in case that the user information and the match condition correspond to the condition that is set for the desired basic quest, setting the desired basic quest as the basic quest.

The setting of the extended quest may include receiving the user information and the match condition from the game performing server; checking the received user information and match condition, and checking an extended quest that has been completed until a previous match according to the checked user information and match condition; and setting the extended quest, one randomly selected from among the remaining ones of the extended quests that are providable to the user based on the match condition, except the completed extended quest.

The quest providing method may further include, when the user terminal accesses the game performing server, transmitting an ongoing quest that has been being performed by the user to the game performing server and controlling the ongoing quest to be displayed on the user terminal.

The displaying of the ongoing quest includes controlling the game performing server to determine whether the transmitted ongoing quest is the basic quest, the extended quest, and the repeated quest, and to configure a screen of the user terminal such that the quests are displayed at different display regions; and controlling the game performing server to transmit the configured screen to the user terminal to display the screen thereon.

The applying of the quest to the match may include, when an input for checking a quest list, displayed on the user terminal, with at least one quest that is applicable to the game is received from the user terminal, displaying the quest list on the user terminal; performing the game by applying at least one quest included in the quest list when the game is started; determining whether there is accomplished one of the applied quests by using game performance information received from the game performing server; in case that there is the accomplished quest, recognizing information related to the accomplished quest; transmitting, to the user terminal, information reporting that a quest corresponding to the recognized quest information has been accomplished.

The displaying of the quest list may include dividing at least one quest included in the quest list according to at least one of the basic quest, the extended quest, and the repeated quest and displaying it.

The quest providing method may further include, when a selection input for any one quest included in the quest list is received from the user terminal, displaying detailed information on the user terminal, the detailed information serving to display at least one of game performance contents that are required to be completed for accomplishing the quest selected according to the selection input, contents previously completed by the user among the required game performance contents, and remaining game performance contents that are required to be completed except the previously completed contents.

Another exemplary embodiment of the present invention provides an apparatus providing a quest in an online game, including: a basic quest setter configured to store a plurality of basic quests that are provided in a stepwise manner by being connected to each other such that when one of the basic quests is completed, another basic quest is started; an extended quest setter configured to store a plurality of extended quests that are provided one time per user; a repeated quest setter configured to set a plurality of repeated quests that are repeatedly providable; and a quest manager configured to receive user information corresponding to a user terminal accessing a game performing server and a match condition including at least one condition required to perform a match by the game performing server, and respectively receive the basic quest, the extended quest, and the repeated quest from the basic quest setter, the extended quest setter, and the repeated quest setter according to the user information and the match condition, to transmit them to the game performing server.

The quest manager may check the user information and the match condition, checks a basic quest that has been completed until a previous match among the basic quests stored in the basic quest setter according to the checked user information and match condition, determine whether there is a desired basic quest that is to be performed by being connected to the completed basic quest, and, in case that there is the desired basic quest, set the desired basic quest as the basic quest.

The quest manager may determine whether the user information and the match condition correspond to a condition that is set for the desired basic quest, and, in case that the user information and the match condition correspond to the condition that is set for the desired basic quest, set the desired basic quest as the basic quest.

The quest manager may check the user information and the match condition, check an extended quest that has been completed until a previous match among the extended quests stored in the extended quest setter, and set, as the extended quest, one randomly selected from among the remaining the extended quests except the completed extended quest, according to the checked user information and match condition.

The quest manager may respectively receive detailed information related to the basic quest, the extended quest, and the repeated quest from the basic quest setter, the extended quest setter, and the repeated quest setter, and analyze performed information and performing information of each of the basic quest, the extended quest, and the repeated quest to transmit the analyzed information to the game performing server, the performed information indicating information related to the performed quest and the performing information indicating information related to the quest to be performed.

MODE FOR INVENTION

Hereinafter, a method and an apparatus for providing a quest in an online game in accordance with each exemplary embodiment of the present invention will be described with reference to the accompanying drawings.

It is obvious that the following exemplary embodiment is a detailed description which is provided for more understanding of the present invention but does not limit the scope of the present invention. Therefore, an equivalent invention which performs the same function as the present invention may be also covered by the scope of the present invention.

In adding reference numerals to components of each drawing, even though the same components are illustrated in different drawings, it is to be noted that these components are denoted by the same reference numerals if possible. In describing exemplary embodiments of the present invention, well-known functions or constructions will not be described in detail since they may unnecessarily obscure the understanding of the present invention.

In addition, in describing components of the present specification, terms such as first, second, A, B, (a), and (b) may be used. These terms are used only to differentiate the components from other components, but the nature, sequence, order, etc. of the corresponding components are not limited by these terms. When a component is "connected", "coupled", or "linked" to another component, it is to be noted that the component may be directly connected or linked to the another component, but the component may be "connected", "coupled", or "linked" to the another component via another component therebetween.

In an exemplary embodiment of the present invention, "communication", "communication network" and "network" may be used to have the same meaning. The three terminologies indicate a wired or wireless local area and wide area data transmitting/receiving network through which a file is transmitted/received between a user terminal, another user terminal, and a download server.

In the following description, "game server" indicates a server computer to which users access to use game contents. In the case of a game which has a small capacity or a small number of users, a plurality of game programs may be operated by one game server. Further, in the case of a game which has a large capacity or a large number of real time accessing members, one or more game servers which operate one game may be provided depending on a function of the game.

In addition, middle ware for database or servers which perform payment processing may be connected to the game server, but the description thereof will be omitted in the present invention.

In the present invention, game characters indicate all characters which appear in the game through which users experience one of sports among on-line games. The game character appears on a game screen and shows a predetermined action in accordance with the manipulation of the user. Further, the game character increases a level by accumulating a predetermined experience point in accordance with a result of playing the game and when the level is increased, a capability point of the character becomes stronger.

In the present invention, sports indicate general sports and all kinds of sports which may be played as an on-line game. For example, the sports include soccer, baseball, basketball, tennis, volleyball, track game, or martial arts.

FIG. 1 is a flowchart showing a method for providing a quest in an online game in accordance with an exemplary embodiment of the present invention.

Referring to FIG. 1, a game client is first executed (S110). An online game may be performed by accessing a webpage provided by a game server and executing a game client. If the game client is not installed in a user computer, a user can download the game client from a game server to install it in the user computer. Once a corresponding game is started, the game server identifies the user to pop up a quest which the user is in the process of performing until previous game performance (S120). Herein, the game server can identify the user through a login process of the web page. Then, after identifying the user, the game server extracts quest data of the game which the user is in the process of playing until the last play of the game, from stored user data to display a pop-up window with the quest data. The user data includes various information, such as game execution information, winning rate, holding items, and levels, of users registered in the game server. In the present invention, the user data includes quest data of each user.

Figure 2:
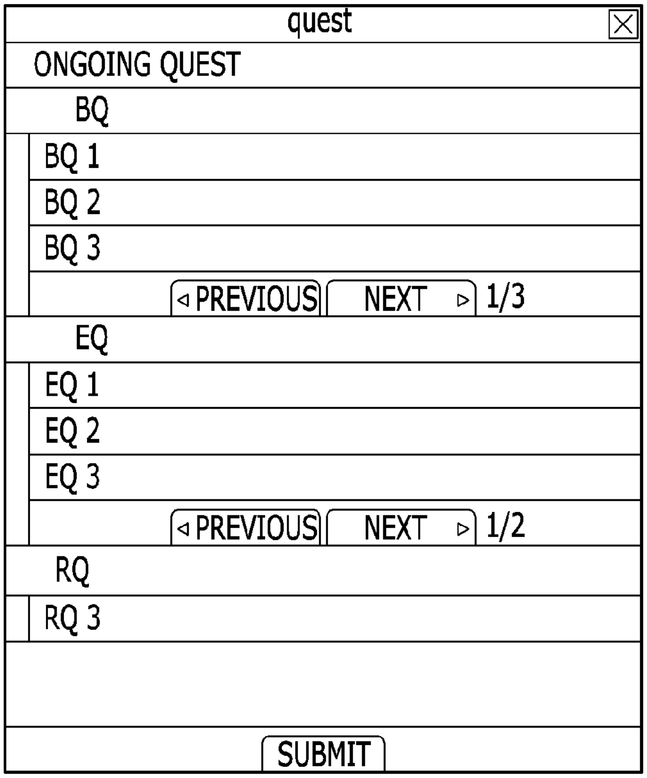
FIG. 2 shows a quest pop-up screen in accordance with the present exemplary embodiment.

FIG. 2 shows a quest pop-up screen in accordance with the present exemplary embodiment.

As shown in FIG. 2, in the quest pop-up screen displayed in the present invention, ongoing quests may be divided according to the types of quests, and the quests may be displayed according to the divided types of quests. As shown in FIG. 2, in the present exemplary embodiment, the quests are divided into basic quests, extended quests, and daily repeated quests. The basic quests, the extended quest, and the daily repeated quests will be described later.

As described above, the quest is illustrated as being displayed as a pop-up window when the game client is executed. However, the quest pop-up window is merely one example for a form that is easily recognized by a user. Accordingly, the quest may be displayed as another form that can be easily recognized by a user instead of the pop-up window.

Referring to FIG. 1 again, once the ongoing quest is displayed on a pop-up window shown in FIG. 2, the user may select one of the quests displayed on the pop-up window (S130). Once the user selects one of the quests through the game client, the game server displays detailed information related on the selected quest (S140). Herein, the detailed information may include information related to the game until the last play of the game and information related to the game to be played to accomplish the quest as well as a detailed method for accomplishing the quest. The detailed information may be variously set depending on types and characteristics of the game.

In the meantime, the quest may selected by moving an icon on corresponding one of the quests displayed on the pop-up window and clicking it, or by merely moving the icon on the corresponding one of the quests displayed on the pop-up window. In the case of selecting the quest by clicking it, detailed quest information may be displayed on a new window. In the case of selecting the quest by moving the icon on it, the detailed quest information may be displayed as a speech bubble at one side of the icon.

After the user checks the detailed quest information or the user does not select the quest displayed on the pop-up window, a lobby screen is displayed (S150). The lobby screen is a screen for facilitating selection of a character to be used on the game or selection of game modes, channels, or game rooms by the user. The user can set conditions of a match to be performed on the lobby screen. Further, the lobby screen of the present invention provides a quest list view button and a game stop button.

Then, whether the user selects the game stop button is determined (S160). When the game stop button is selected, the game client cuts off the access to the game server to quit the game.

Then, whether the user selects the quest list view button through the game client to view the quest list is determined (S170). If the user selects the quest list view button, a quest list screen is displayed (S180). The quest list screen with the quest list may be displayed as an additional screen unlike the quest pop-up window. Since the quest list is provided by using the additional screen instead of the pop-up window, the number of the quests that can be displayed at once may be increased and detailed information related each quest may be displayed along therewith. Further, if necessary, more detailed information may be displayed by dividing the screen into additional tab screens according to quest types. A detailed structure of the quest list screen will be described later.

Then, as in the quest pop-up window, as one of the displayed quests is selected, detailed information related to the selected quest may be provided (S130).

In contrast, when the user does not select the quest list view button, the user sets a match condition provided on the lobby screen to play the match (S190). When the match condition is set, the game server set a quest according to the set match condition (S200). As the user selects a match start button after completing the setting of the match condition on the lobby screen, a mode is set according to the match condition.

As described above, the match condition includes a match mode, cannel, a match room, and the like. Particularly, the match mode includes various match modes according to the game, and the match modes may be mainly divided into a single mode in which the user plays a match against an artificial intelligence provided from the game server, and a multimode in which the user plays a match against another user or other users. In general, a different quest may be provided to each mode. Further, the match condition may provide different quests with different conditions in addition to the mode. For example, in the case that the online game is an online soccer match, the user may select a league and a team in addition to the mode. The league is a kind of matching system per area in a real offline soccer match. In the online soccer match that is similar to an offline soccer match, the user may select a league. Similarly, different quests may be set according to the league selected by the user.

As a result, the quest may be varied according to a game condition. Accordingly, once the match condition is set, the quest is set by the game server.

Once the setting of the quest is completed in the game server, the game server immediately executes the match since the user has already selected the match start button. This match progresses according to a user manipulation, the user manipulation is transmitted to the game server through the game client, and the game server performs the match by transmitting the user manipulation result to the game client according to a predetermine rule.

Then, whether the quest is accomplished during performance of the match is determined (S220). The accomplishment state of the quest is determined according to whether at least one of the ongoing quests is accomplished. If even one quest is accomplished, the game server stores the accomplished quest as a complete quest. Thereafter, whether the match is ended is determined (S240). If the match is not ended, the game server determines whether there is a quest that is accomplished again (S220). However, if the match is ended, the lobby screen is displayed again to determine whether the game is ended (S150).

As described above, the quest setting step S200 has been described to be performed before the match executing step S210, but a quest may be controlled to be set when the match satisfies a specific condition during the execution of the match.

Figure 3:
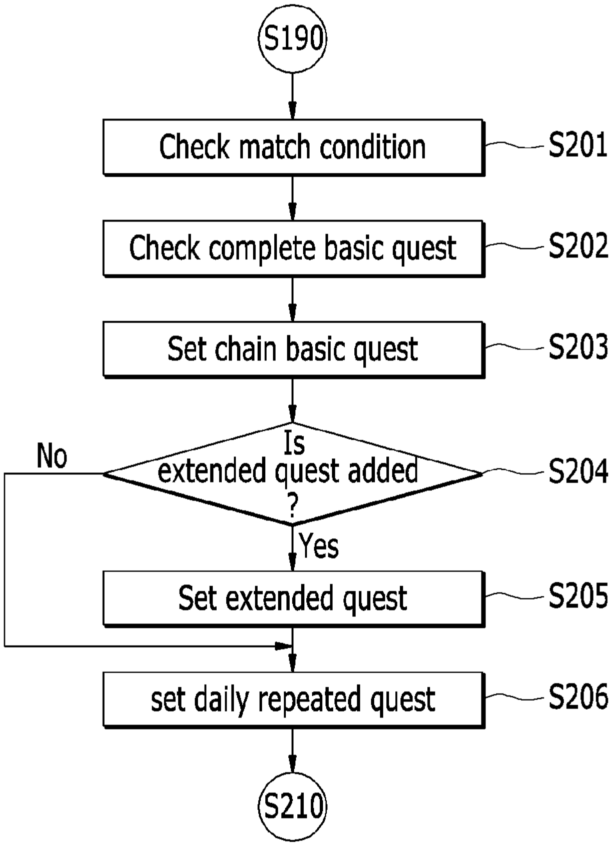
FIG. 3 is a flowchart showing how a quest is set in accordance with the present exemplary embodiment.

FIG. 3 is a flowchart showing how a quest is set in accordance with the present exemplary embodiment.

The quest setting step in FIG. 1 may be performed according to the flow shown in FIG. 3. Referring to FIG. 3, to perform the quest setting step, the match condition set in the previous match condition setting step is first checked (S201). As described above, the quest may be varied according to the set match condition. Accordingly, before the match quest is set, the set match condition is required to be checked. Once the set match condition is checked, a basic quest, particularly a complete basic quest, which corresponds to the set match condition and has been completed until the previous game was played, among a plurality of quest types (S202). As described above, in the present invention, the quests are divided into a plurality of types, e.g., a basic quest, an extended quest, and a daily repeated quest. The basic quest is a quest that is provided per step according to a game progressing result of a user, and serves as a guide for allowing a user to sequentially learn game rules and simultaneously game characteristics. Accordingly, the basic quests may be divided into a common basic quest for allowing the user to learn characteristics of a game itself regardless of the set match condition, and a conditional basic quest for allowing the user to acquire rules according to the match condition. Further, since the basic quest serves to allow the user to sequentially learn game rules, following pertinent basic quests are provided after previous basic quests are accomplished.

Figure 4:
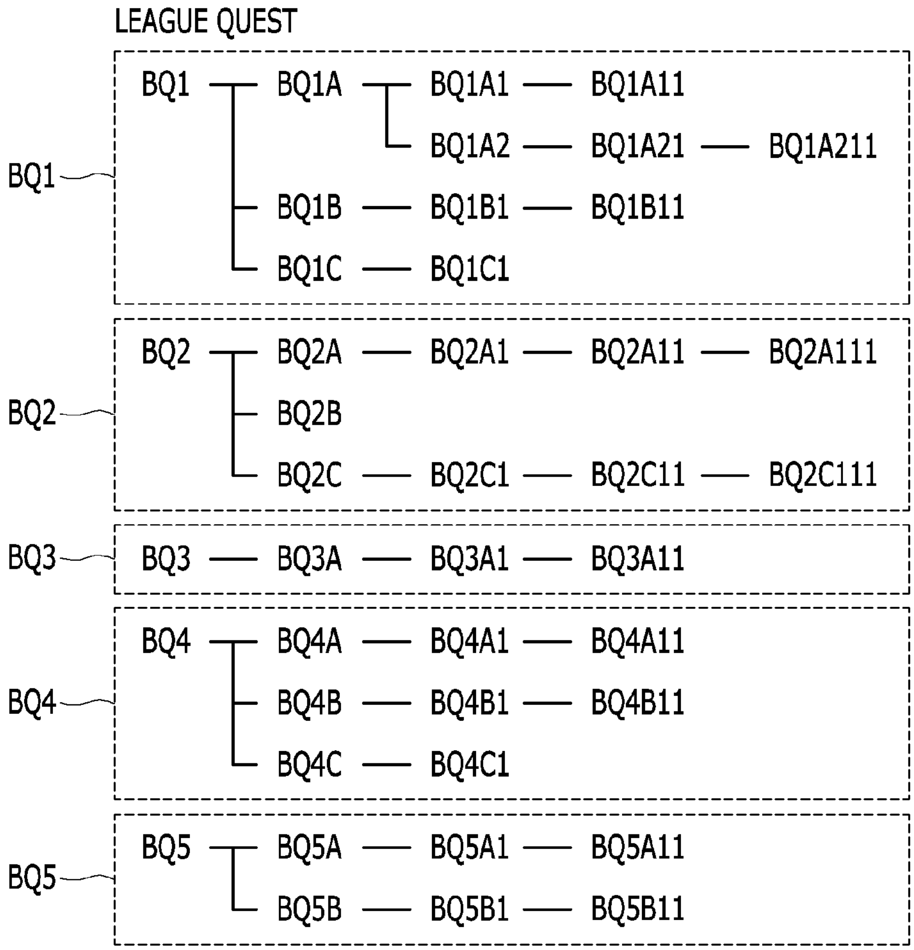
FIG. 4 shows a basic quest in accordance with the present exemplary embodiment.

FIG. 4 shows a basic quest in accordance with the present exemplary embodiment.

The basic quest shown in FIG. 4 is, e.g., a quest of the online soccer match, and may be represented in a form of a plurality of quest trees. Each of the quest trees has steps that are divided into individual parts. In FIG. 4, each of a quest BQ1 for wining a league match and a quest BQ2 for wining a multi match is a conditional basic quest. The quests BQ1 and BQ2 are respectively set in the single mode and the multimode. Further, a quest BQ3 for registering the extended quests, a quest BQ4 for obtaining 10 uniform cards, and a quest BQ5 for scouting players in a transfer market all pertain to the common basic quests, and may set regardless of the match condition. Particularly, the quest BQ3 for registering the extended quests is a kind of quest for quests to serve to allow the user to learn how to use a different type of quest.

As described above, the basic quest has a tree structure including a plurality of connected quests, and thus is required to check a previously completed basic quest, Once the completed basic quest is checked, the game server sets a chain basic quest for the user to perform a next basic quest connected to the completed basic quest (S203). In this case, the connected basic quest may be controlled only when the user information and the match condition correspond to requirements that are set for the next basic quest. For example, even when the previous basic request is completed and there exists a next basic quest connected to the previous basic request, a user who has performed the previous basic quest may have such a level so as to be difficult to perform the next basic quest connected thereto since the level difference between the two connected basic quests. Accordingly, in the present invention, connected basic quest may be controlled only when the user level or the match condition corresponds to the connected next basic quest.

Once the setting of the basic quest is completed, the game server determines whether an extended quest is added (S204). The extended quest is a quest including quests having various levels ranging from a quest that can be accomplished during a short period of time to a quest that requires a long period of time to be accomplished, to maintain an interest of the user in the game. Since the main purpose of the extended quest is to maintain the interest of the user in the game, the extended quest may be provided in various forms and formats. A concealed quest or a usual quest may be provided. When a condition for accomplishing the concealed quest or the unusual quest is very difficult and a very high prize corresponding to the condition is set, information of a user who accidently accomplished the concealed or unusual quest may spread to other users, thereby improving their curiosities and interests. Further, the extended quest is not necessarily provided to users unlike the basic quest, and thus may be randomly provided. For example, the extended quest may be randomly provided in such a way so as to be provided to only one of the users having the same level who have been performing the same number of matches. In this way, it is possible to increase a user's expectation level of the extended quest. Accordingly, the game server determines whether to additionally set the extended quest for each of presently accessing users. When the game server determines to additionally add the extended quest, the game server what quest is added to set the extended quest.

FIG. 5 shows a part of an extended quest in accordance with the present exemplary embodiment.

FIG. 5 also shows an extended quest in an online soccer game as an example, and the extended quest is divided according to match condition and use. The extended quest may be set regardless of the match condition, but the extended quest according to the match condition may be set. However, the extended quest is provided as an independently performed quest unlike the basic quest in which a plurality of quests connected in a tree structure. Further, it is difficult to accomplish the extended quest like a quest for scouting 100 players and a quest for releasing 100 players in FIG. 5, and it is preferable to set an unusual quest as the concealed quest.

Once the extended quest is set, the game server sets a daily quest (S206). The daily quest is a quest that can be repeatedly performed by a user. In general, if the extended quest is accomplished, the same quest is not provided again. Herein, not providing the same quest indicates the same quest is not provided in the same condition. For example, a quest such as league winning in a single mode is not provided again when a match is played in the same single mode, but the same quest may be provided when a match is played in a different match condition such as a multimode. In this case, the game server may identify a setting number of extended quests per user to provide the extended quests at one time per user.

However, a daily repeated quest may be repeatedly provided even in the same match condition. The daily repeated quest can be repeatedly provided whenever access is performed, thereby providing a user to a sense of accomplishment.

FIG. 6 shows a part of a daily repeated quest in accordance with the present exemplary embodiment.

FIG. 6 shows only a part of a daily repeated quest, and various daily repeated quests may be provided for each game. However, a user may easily feel bored with the same quest that has been repeated every time. Accordingly, in the present invention, the game server may randomly selectively provide a plurality of quests designated as daily repeated requests instead of simply repeatedly providing the same quest every time. Similarly, the daily repeated quest may be divided per match condition, and may be provided to correspond to pertinent match condition As described above, the online game in accordance with the present invention may be provided by dividing the quests into the basic quest, the extended quest, and the daily repeated quest, and each quest may be provided to correspond to match condition. The basic quest may be principally provided to all users at one time, the extended quest may be provided to each user at one time at a random possibility, and the daily repeated quest may be repeatedly provided to all users.

Figure 7:
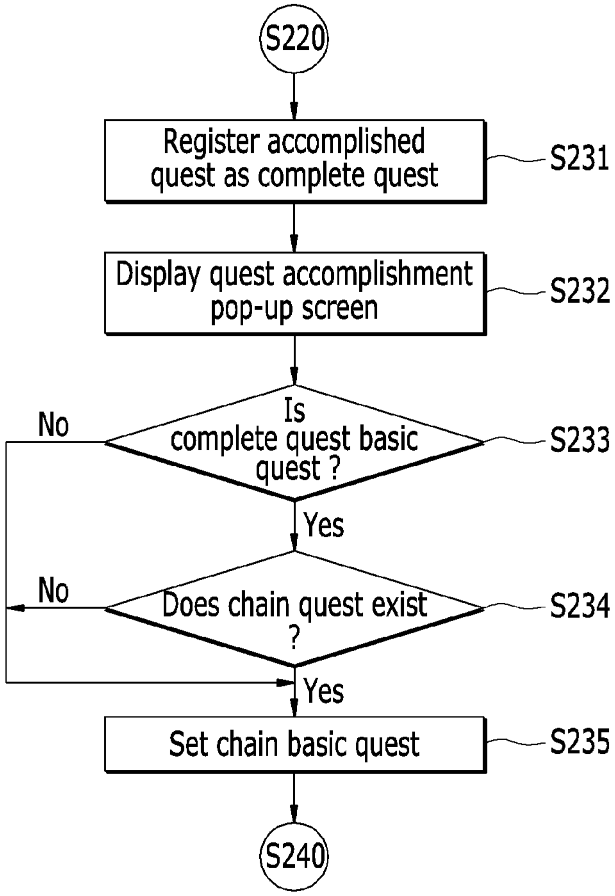
FIG. 7 is a flowchart showing how a completed quest is written in accordance with the present exemplary embodiment.

FIG. 7 is a flowchart showing how a completed quest is written in accordance with the present exemplary embodiment.

Once a quest is accomplished during performance of the match (S220), the game server registers the accomplished quest as a complete quest (S231). This complete quest may be used for checking the quest that is completed when the user performs quest management later, and may serve to provide information for preventing a quest that can be provided only one time per user like the basic quest or the extended quest, from being repeatedly provided. Once the complete quest is registered, the game server displays a pop-up window for informing a user that the quest is accomplished (S232).

Figure 8:
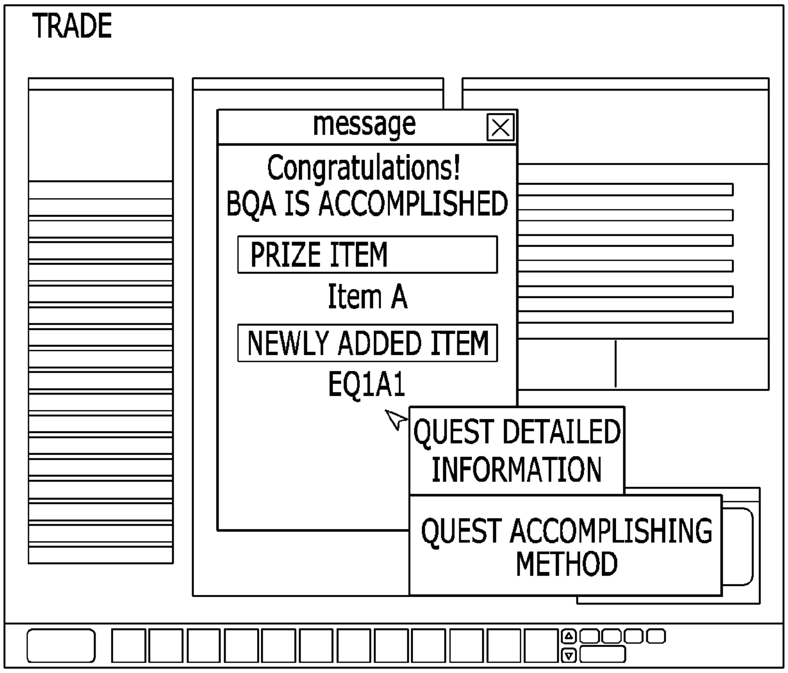
FIG. 8 shows a quest list display screen in accordance with the present exemplary embodiment.

FIG. 8 shows a quest accomplishment pop-up window in accordance with the present exemplary embodiment.

The quest accomplishment pop-up window may display all the quests with the accomplished quest being marked as a complete quest identically to the pop-up window with the ongoing quest. However, as shown in FIG. 8, only the accomplished quest is displayed along with an item as a prize for the accomplishment of the quest. Accordingly, it is possible to inform a user which item is accomplished clearly and simultaneously facilitate easy recognition of the prize according to the accomplished quest, thereby improving the sense of accomplishment.

In the meantime, whether the complete quest is a basic quest is determined (S223). When the complete quest is the basic quest, whether a chain quest according to a quest tree as shown in FIG. 4 exists is determined (S234). As described above, since the basic quest serves to enable a user to sequentially learn a game rule, a chain quest may exist. Accordingly, in the case that the complete quest is the quest, after whether the chain quest exists is determined, when the chain quest exists, the game server provides a new quest to the user by additionally setting a chain basic quest (S235). In this case, the basic quest added when the new quest is additionally set may be displayed as a pop-up window. Alternatively, when the complete basic quest is displayed on the pop-up window, the added basic quest may be displayed along therewith. In this case, when an item is positioned at a region at which the added basic quest is displayed, detailed information related to the added basic quest may be displayed as a speech bubble.

As described above, the quest accomplishment pop-up window has been described to be displayed in the middle of the match since the step S230 in which the complete quest is stored is performed before the step S240 in which the match is ended. However, the quest accomplishment pop-up window may not be displayed in the middle of the match according to game types or match modes. For example, in the multiplayer mode in which a user completes with other users, the displayed quest accomplishment pop-up window is a hindrance to the performance of match by the user who has been accomplished. As in the multi-play mode, even in the single player mode, displaying the quest accomplishment pop-up window may hurt concentration of the user on the game, thereby decreasing an interest of the user in the game. Accordingly, the step S230 (S231 to S235) in which the complete quest is stored is partially or entirely performed after the step S240 in which the match is ended according to the game type or the match mode.

Figure 9:
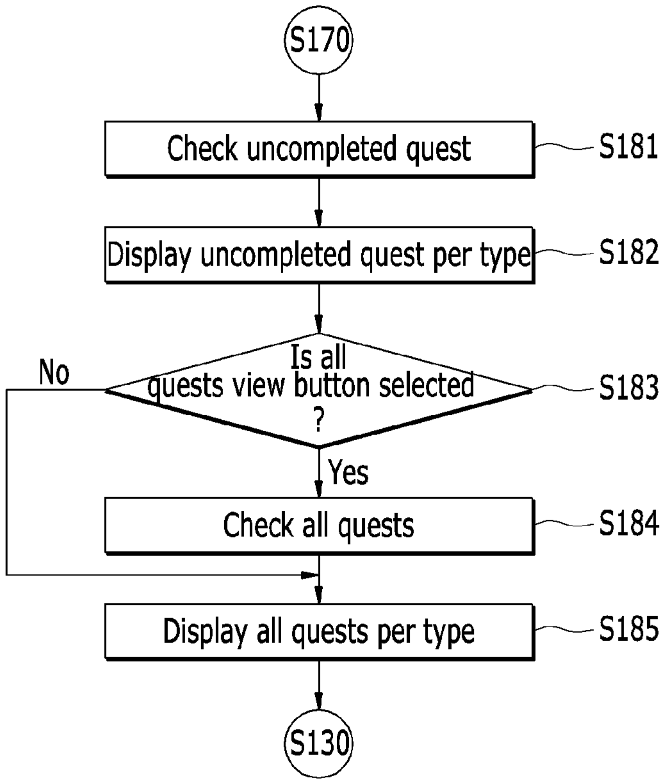
FIG. 9 is a flowchart showing how a quest list is displayed in accordance with the present exemplary embodiment.

FIG. 9 is a flowchart showing how a quest list is displayed in accordance with the present exemplary embodiment.

Once a quest list view button on the lobby screen is selected (S170), the game server checks uncompleted one of the quests provided to the user (S180). Then, the game server divides and displays the checked uncompleted quest according to quest types or uses. In this case, the criterion for dividing the quests may be variously adjusted per game.

Figure 10:
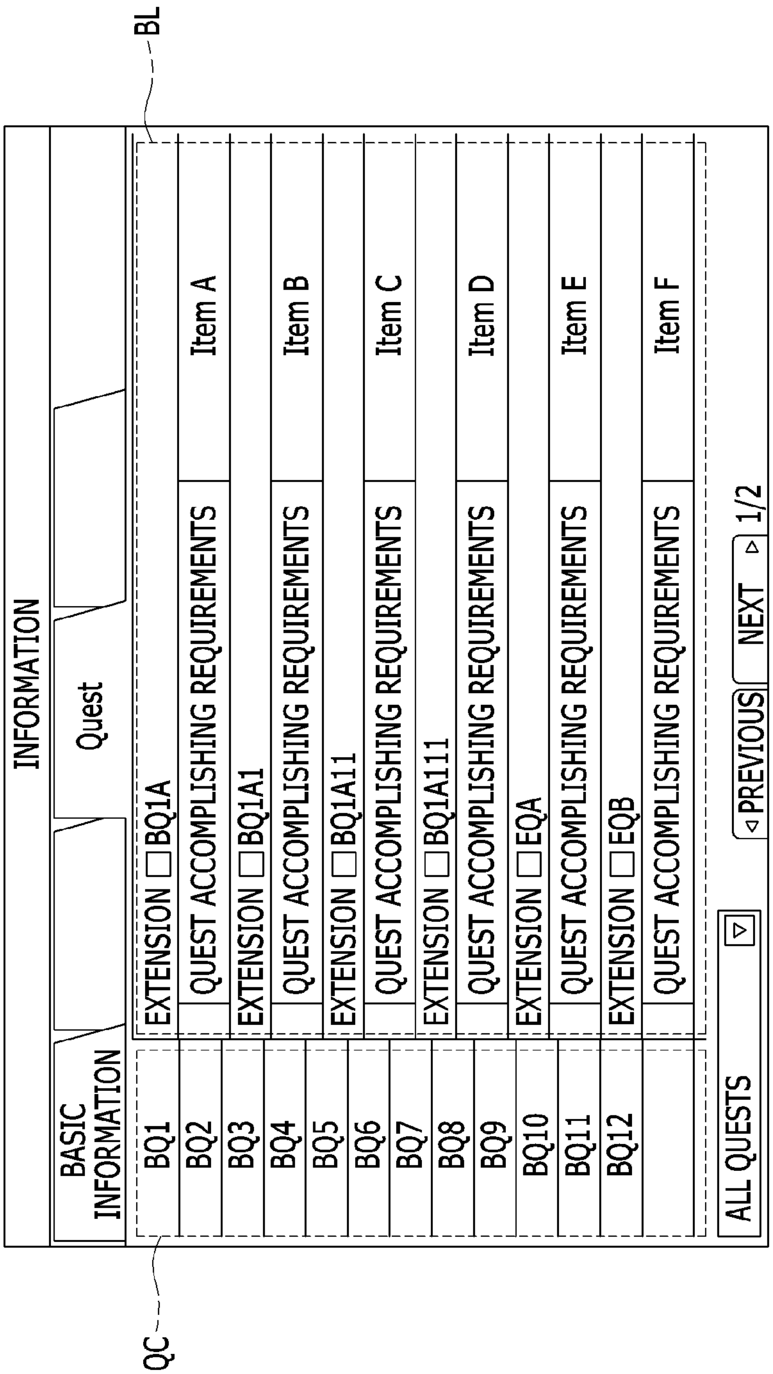
FIG. 10 shows a quest accomplishment pop-up screen in accordance with the present exemplary embodiment.

FIG. 10 shows a quest accomplishment pop-up screen in accordance with the present exemplary embodiment.

FIG. 10 shows a quest list display screen in which the quests are divided according to match condition and match use. In the quest list display screen, a left end indicates a quest category showing characteristics of the quests divided according to the designated criterion, and a right end indicates a list of the quests included in each quest category. Each quest list is configured to include a name (or a condition for completing a quest) and a prize item that is provided when the quest is completed, to facilitate easy recognition of brief contents of the quest. Further, an extension check box is provided at one end (a left end in FIG. 10) of each quest list. When the extension check box is selected, the game server displays a performance state of the quest that is performed until that time to correspond to the selected extension check box. In addition, when a name of one of each quest is selected, detailed information of the corresponding quest may be displayed. Alternatively, when the extension check box is selected, the performance state of the quest that is performed until that time and detailed information of the corresponding quest.

As described above, the quests have been described to be divided according to the use to configure the quest categories, but the quest categories are divided into the basic quest, the extended quest, and the daily repeated quest, similarly to FIG. 2.

Further, the quest list display screen provides an all quests view button for displaying all quests provided to the user including uncompleted quests and the completed quests.

Then, whether the all quests view button is selected is determined (S183). When the all quests view button is selected, the game server checks (collects) all the quests that are provided to the user (S184). Once all the quests provided to the user are checked, all the quests are divided according to the predetermined criterion (S185). In this case, the quests may be divided and displayed according to the quest uses as shown in FIG. 10, or according to the quest types as shown in FIG. 2.

Figure 11:
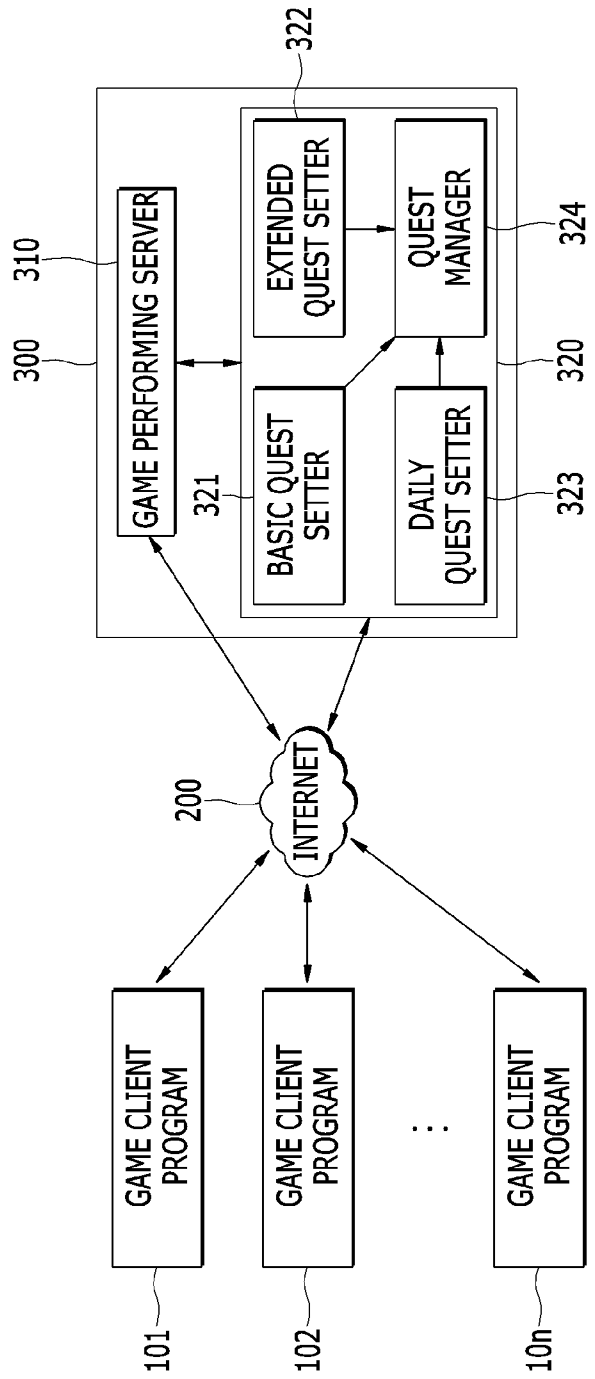
FIG. 11 is a block diagram showing a system for providing a quest in online game in accordance with the present exemplary embodiment.

FIG. 11 is a block diagram showing a system for providing a quest in online game in accordance with the present exemplary embodiment.

As shown in FIG. 11, the system for providing a quest in online game in accordance with the present exemplary embodiment includes a plurality of user terminals 101-10*n*, an Internet 200, and a game server 300. Each of the user terminals 101-10*n* is connected the game server 300 through the Internet 200 to install a game client for performing a game.

The game server 300 includes a game performing server 310, and a quest providing apparatus 320.

The game performing server 310 first provides a web page that facilitates access of the user thereto, and provides many services such as various kinds of Internet games, chatting, societies, and shopping malls. In FIG. 10, a plurality of users is shown to access the game performing server 310 through the user terminals 101-10*n* such as computers, but may access the game performing server 310 through different types of terminals to perform a game. For example, the different types of terminals may include a mobile communications terminal, a television capable of using the Internet, and the like.

The game performing server 310 may include a web database for storing items for enabling users to perform various functions on the web or game, and for storing information related to items held by users. The game performing server 310 sells various items to users by referring to the web database and, when a user buys such an item, stores corresponding user information in the web database.

Further, in the present invention, the game performing server 310 provides a lobby screen for enabling a user to select match conditions, and stores the match conditions selected by the user and transmits them to the quest providing apparatus 320.

Once a game is selected by a user through the game performing server 310, the game performing server 310 drives a game client pre-installed in the user terminal 101-10*n*, and the user terminal 101-10*n* accesses the game performing server 310 through the Internet 200 by the driven game client. Herein, the game client has been described to be pre-installed in the user terminal 101-10*n*. Otherwise, the game performing server 310 may determine whether there is a user program for performing a game to control the user program to be installed at an appropriate time Further, the game performing server 310 may include a game database (not shown) for storing a game logic for controlling the corresponding game. Herein, the game logic, which is rules specified to automatically performing a game according to predetermined rules, indicates a series of performance processes on the game.

The quest providing apparatus 320 includes a basic quest setter 321, an extended quest setter 322, a daily repeated quest setter 323 and a quest manager 324 to divide and provide various kinds of quests. The basic quest setter 321, the extended quest setter 322, and the daily repeated quest setter 323 respectively store the basic quest, the extended quest, and the daily repeated quest, and also stores quest completing requirements, prize items, and quest detailed information of the stored quests. In other words, the basic quest setter 321, the extended quest setter 322, and the daily repeated quest setter 323 respectively store quest data of the corresponding quests.

Among these elements, the basic quest setter 321 stores a plurality of basic quest data, and stores a connection structure of the basic quests as a tree structure as shown in FIG. 4. This is because, since the basic quests are connected and sequentially provided Instead of being independently provided as individual quests as described above, the basic quest setter 321 stores not only the plurality of basic quest data but also the connection structure between the basic quests as the basic quest data.

The quest manager 324 receives user information from the game performing server 310, and allows the user information to correspond to basic quest data, extended quest data, and daily repeated quest data from the basic quest setter 321, the extended quest setter 322, and the daily repeated quest setter 323. As a result, the basic quest data, the extended quest data, and the daily repeated quest data of the basic quest setter 321, the extended quest setter 322 and the daily repeated quest setter 323 include information related to all the quests as simple data of the quests themselves. In other words, not only the quest that is being actually performed by the user but also quest data that is yet not provided to the user are stored. Accordingly, the quest manager 324 generates user quest data for the quest that is being performed or is performed by the user, by allowing applied user information to correspond to quest data stored in the basic quest setter 321, the extended quest setter 322, and the daily repeated quest setter 323. Herein, a performance state of each quest that is being performed by the user is included in the user quest data.

Resultantly, the quest providing apparatus 320 includes the basic quest setter 321, the extended quest setter 322, and the daily repeated quest setter 323, for storing the respective corresponding kinds of quest data, and the quest manager 324 for allowing the quest data stored in the basic quest setter 321, the extended quest setter 322, and the daily repeated quest setter 323 to correspond to the user information, to provide various kinds of quests per user along with quest performance states.

The quest providing apparatus 320 may be provided as data base that is connected to the game performing server 310, or may be embodied as a separate external apparatus.

The method for providing a quest in an online game in accordance with the exemplary embodiments of the present invention as described above may be executed by the applications basically installed in the terminal (including programs included in a platform, an operating system, or the like which are basically installed in the terminal), and may also be executed by the applications (i.e., programs) which are directly installed in the terminal by the user via an application store server or an application store server such as a web server associated with the applications or the corresponding services. In this respect, the method for providing a quest in an online game in accordance with the exemplary embodiments of the present invention may be implemented by the applications (i.e., programs) which are basically installed or directly installed by the user in the terminal and may be recorded in a computer readable recording medium of the terminal, and the like.

The programs are recorded in the computer readable recording medium and are executed by the computer, such that the above-mentioned functions may be executed.

As described above, in order for the computer to read the programs recorded in the recording medium and execute the method for providing a quest in an online game in accordance with the exemplary embodiments of the present invention implemented by the programs, the above-mentioned programs may include codes which are coded with computer languages such as C, C++, JAVA, machine language, and the like which may be read by a processor (CPU) of the computer.

The code may include a function code associated with a function of defining the above-mentioned functions and may also include an execution procedure related control code required for the processor of the computer to execute the above-mentioned functions according to a predetermined procedure.

Further, the code may further include a memory reference related code indicating at which location (address number) of the memory inside or outside the computer additional information or media required for the processor of the computer to execute the above-mentioned functions need to be referenced.

Further, in order for the processor of the computer to execute the above-mentioned functions, when the processor needs to communicate with any other computers or servers, etc. at a remote location, the code may further include a communication related code about how the processor of the computer communicates with any other computers or servers at a remote location or which information or media the processor of the computer transmits and receives at the time of the communication, by using the communication module (for example, wired and/or wireless communication module) of the computer.

Further, a functional program for implementing the present invention, a code and a code segment associated therewith, and the like may be easily inferred or changed by programmers in the art to which the present invention pertains in consideration of a system environment of the computer which reads the recording medium and executes the program.

Hereinabove, examples of a computer readable recording medium recorded with programs for performing the method for providing a quest in an online game in accordance with the exemplary embodiments of the present invention as described above include a ROM, a RAM, a CD-ROM, a magnetic tape, a floppy disk, an optical media storage device, and the like.

Further, a computer readable recording medium recorded with programs as described above may be distributed to a computer system connected through a network and thus store and execute a computer readable code by a distributed manner In this case, at least one computer among a plurality of distributed computers may execute a part of the above-mentioned functions and transmit the executed results to at least one of the other distributed computers, and the computer receiving the result may also execute a part of the above-mentioned functions and provide the executed results to the other distributed computers.

In particular, a computer readable recording medium recorded with applications, which are programs for executing the method for providing a quest in an online game in accordance with the exemplary embodiments of the present invention, may be a storage medium (for example, hard disk, and the like) included in an application store server or an application providing server such as a web server associated with applications or corresponding services, and the like, or the application providing server itself A computer, which may read a recording medium recorded with applications that are programs for executing the method for providing a quest in an online game in accordance with the exemplary embodiments of the present invention, may include not only a general PC such as a typical desktop and a laptop but also a mobile terminal such as a smart phone, a tablet PC, personal digital assistants (PDAs), and a mobile communication terminal, and is to be construed as all the computable devices When a computer, which may read a recording medium recorded with applications that are programs for executing the method for providing a quest in an online game in accordance with the exemplary embodiments of the present invention, is a mobile terminal such as a smart phone, a tablet PC, a personal digital assistant (PDA), and a mobile communication terminal, the applications are downloaded from an application providing server to a general PC and thus may also be installed in the mobile terminal through a synchronization program Hereinabove, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. The codes and the code segments configuring the computer program may be easily inferred by a person having ordinary skill in the art to which the present invention pertains. The computer programs are stored in the computer readable media and are read and executed by the computer and may implement the exemplary embodiment of the present invention. As the storage medium of the computer programs, a magnetic recording medium, an optical recording medium, and the like may be used.

Further, it will be further understood that the terms "comprises" or "have" used in this specification may include the corresponding components unless explicitly described to the contrary and therefore, do not preclude other components but further include the components. In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

The spirit of the present invention has been just exemplified. It will be appreciated by those skilled in the art that various modifications and alterations can be made without departing from the essential characteristics of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims and it should be interpreted that all spirits equivalent to the following claims fall within the scope of the present invention.

The invention claimed is:

1. A method performed by a quest providing computer apparatus for displaying a quest in an online game in a customized manner on a remote user terminal, the quest displaying method comprising:

sensing at least one remote user terminal access to a game performing server;

receiving, from the game performing server over the Internet, user information corresponding to the user terminal accessing the game performing server and a match condition including at least one condition required to perform a match by a game server;

setting a basic quest according to the received user information and match condition, such that when one quest is completed, another quest is started;

setting an extended quest from among a plurality of quests according to the user information and the match condition, wherein the extended quest is a quest to be provided one time per user;

setting a repeated quest according to the user information and the match condition, wherein the repeated quest is a quest to be repeatedly provided from the plurality of quests;

transmitting the basic quest, the extended quest, and the repeated quest, which are set by the quest providing apparatus, over the Internet to the game performing server;

displaying the basic quest, the extended quest, and the repeated quest on the user terminal by the game performing server such that the basic quest, the extended quest, and the repeated quest are displayed at different display regions on a screen of the user terminal; and, applying the basic quest, the extended quest, and the repeated quest to the game.

2. The quest providing method of claim 1, wherein the setting of the basic quest includes:

receiving the user information and the match condition from the game performing server;

checking the received user information and match condition and checking a basic quest that has been completed until a previous match according to the checked user information and match condition;

determining whether there is a desired basic quest that is to be performed by being connected to the completed basic quest; and in case that there is the desired basic quest, setting the desired basic quest as the basic quest.

3. The quest providing method of claim 2, wherein the setting of the desired basic quest as the basic quest includes determining whether the user information and the match condition correspond to a condition that is set for the desired basic quest; and in case that the user information and the match condition correspond to the condition that is set for the desired basic quest, setting the desired basic quest as the basic quest.

4. The quest providing method of claim 1, wherein the setting of the extended quest includes receiving the user information and the match condition from the game performing server;

checking the received user information and match condition, and checking an extended quest that has been completed until a previous match according to the checked user information and match condition; and setting the extended quest, one randomly selected from among the remaining ones of the extended quests that are providable to the user based on the match condition, except the completed extended quest.

5. The quest providing method of claim 1, further comprising when the user terminal accesses the game performing server, transmitting an ongoing quest that has been being performed by the user to the game performing server and controlling the ongoing quest to be displayed on the user terminal.

6. The quest providing method of claim 5, wherein the displaying of the ongoing quest includes controlling the game performing server to determine whether the transmitted ongoing quest is the basic quest, the extended quest, and the repeated quest; and controlling the game performing server to transmit the configured screen to the user terminal to display the screen thereon.

7. The quest providing method of claim 6, further comprising when a selection input for one of the ongoing quests displayed on the screen is received from the user terminal, controlling detailed information related to the selected quest to be displayed on the user terminal.

8. The quest providing method of claim 6, wherein the applying of the quest to the match includes when an input for checking a quest list, displayed on the user terminal, with at least one quest that is applicable to the game is received from the user terminal, displaying the quest list on the user terminal;

performing the game by applying at least one quest included in the quest list when the game is started;

determining whether there is accomplished one of the applied quests by using game performance information received from the game performing server;

in case that there is the accomplished quest, recognizing information related to the accomplished quest;

transmitting, to the user terminal, information reporting that a quest corresponding to the recognized quest information has been accomplished.

9. The quest providing method of claim 8, further comprising when a selection input for any one quest included in the quest list is received from the user terminal, displaying detailed information on the user terminal, the detailed information serving to display at least one of game performance contents that are required to be completed for accomplishing the quest selected according to the selection input, contents previously completed by the user among the required game performance contents, and remaining game performance contents that are required to be completed except the previously completed contents.

10. An apparatus for displaying a quest in an online game in a customized manner on a remote user terminal, the quest displaying apparatus comprising:

a basic quest setter configured to store a plurality of basic quests in a web database such that when one of the basic quests is completed, another basic quest is started;

an extended quest setter configured to store a plurality of extended quests in the web database, wherein the extended quests are quests to be provided one time per user;

a repeated quest setter configured to set a plurality of repeated quests, wherein the repeated quests are quests to be repeatedly provided from the plurality of quests; and a quest manager configured to:

receive user information over the Internet corresponding to a remote user terminal accessing a game performing server and a match condition including at least one condition required to perform a match by the game performing server, respectively receive the basic quest, the extended quest, and the repeated quest from the basic quest setter, the extended quest setter, and the repeated quest setter according to the user information and the match condition, transmit the received basic quest, the extended quest, and the repeated quest over the Internet to the game performing server, and display the basic quest, the extended quest, and the repeated question on the user terminal such that the basic quest, the extended quest, and the repeated quest are displayed at different display regions on a screen of the user terminal.

11. The quest providing apparatus of claim 10, wherein the quest manager checks the user information and the match condition, checks a basic quest that has been completed until a previous match among the basic quests stored in the basic quest setter according to the checked user information and match condition, determines whether there is a desired basic quest that is to be performed by being connected to the completed basic quest, and, in case that there is the desired basic quest, sets the desired basic quest as the basic quest.

12. The quest providing apparatus of claim 11, wherein the quest manager determines whether the user information and the match condition correspond to a condition that is set for the desired basic quest, and, in case that the user information and the match condition correspond to the condition that is set for the desired basic quest, sets the desired basic quest as the basic quest.

13. The quest providing apparatus of claim 10, wherein the quest manager checks the user information and the match condition, checks an extended quest that has been completed until a previous match among the extended quests stored in the extended quest setter, and sets, as the extended quest, one randomly selected from among the remaining the extended quests except the completed extended quest, according to the checked user information and match condition.

14. The quest providing apparatus of claim 10, wherein the quest manager respectively receives detailed information related to the basic quest, the extended quest, and the repeated quest from the basic quest setter, the extended quest setter, and the repeated quest setter, and analyzes performed information and performing information of each of the basic quest, the extended quest, and the repeated quest to transmit the analyzed information to the game performing server, the performed information indicating information related to the performed quest and the performing information indicating information related to the quest to be performed.

15. A non-transitory computer readable recording medium which stores program code instructions for executing a method for displaying a quest in an online game in a customized manner on a remote user terminal, wherein, when executed by a quest providing computer apparatus, the method includes:

sensing at least one remote user terminal access to a game performing server;

receiving, from the game performing server over the Internet, user information corresponding to the user terminal accessing the game performing server and a match condition including at least one condition required to perform a match by a game server;

setting a basic quest according to the received user information and match condition;

setting an extended quest according to the user information and the match condition, wherein the extended quest is a quest to be provided one time per user;

setting a repeated quest according to the user information and the match condition, wherein the extended quest is a quest to be provided one time per user;

transmitting the basic quest, the extended quest, and the repeated quest, which are set by the quest providing apparatus, to the game performing server over the internet;

displaying the basic quest, the extended quest, and the repeated quest on the user terminal by the game performing server such that the basic quest, the extended quest, and the repeated quest are displayed at different display regions on a screen of the user terminal; and applying the basic quest, the extended quest, and the repeated quest to the game.

* * * * *